United States Patent [19]

Yamauchi

[11] Patent Number: 4,877,282
[45] Date of Patent: Oct. 31, 1989

[54] FOLDABLE SEAT ASSEMBLY FOR MOTOR VEHICLE

[75] Inventor: Yoshihiko Yamauchi, Kanagawa Prefecture, Japan

[73] Assignee: Ikeda Bussan Co., Ltd., Ayase City, Japan

[21] Appl. No.: 181,761

[22] Filed: Apr. 14, 1988

[30] Foreign Application Priority Data

Apr. 17, 1987 [JP] Japan .............................. 62-58339[U]

[51] Int. Cl.⁴ .............................................. B60N 1/10
[52] U.S. Cl. ..................................... 296/65.1; 297/379
[58] Field of Search .................... 296/63, 64, 65.1, 66, 296/69; 297/100–103, 105, 316, 319, 341, 379

[56] References Cited

U.S. PATENT DOCUMENTS 3,408,103 10/1968 Hewitt .................................. 296/66
4,206,946 6/1980 Maertens .............................. 296/66
4,699,418 10/1987 Plavetich ............................. 296/66

Primary Examiner—Joseph F. Peters, Jr.
Assistant Examiner—Jesus D. Sotelo
Attorney, Agent, or Firm—Foley & Lardner, Schwartz, Jeffery, Schwaab, Mack, Blumenthal & Evans

[57] ABSTRACT

A foldable seat assembly is disclosed, which comprises a first supporting structure; a second supporting structure positioned apart from the first supporting structure; a seatback pivotally supported by the second supporting structure so that the seatback is inclinable toward the first supporting structure; a first link structure pivotally connected at one end thereof to the seatback; a first frame member held by the first supporting structure; a second frame member pivotally held by the first link structure; and a cushion supporting member extending between the first and second frame members, the cushion supporting member dangling loosely when a distance between the first and second supporting members is reduced to a certain degree.

9 Claims, 2 Drawing Sheets

FIG. 1
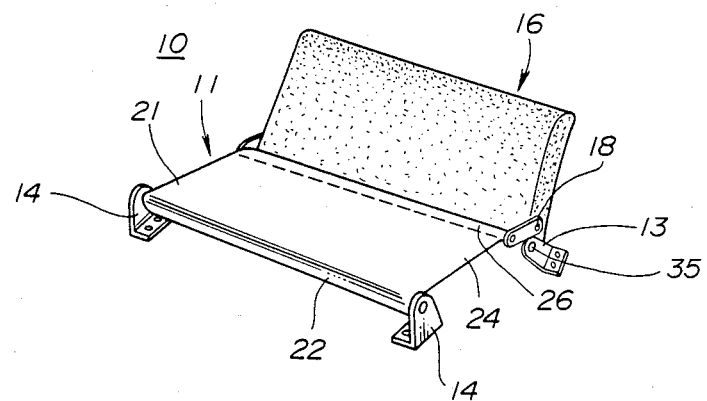
FIG. 2A          FIG. 2B
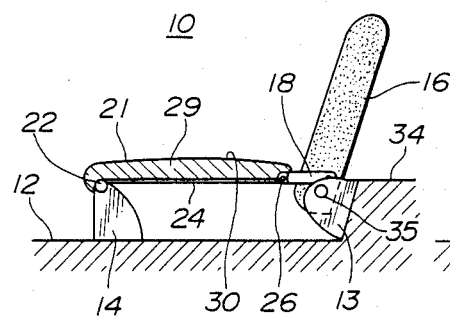   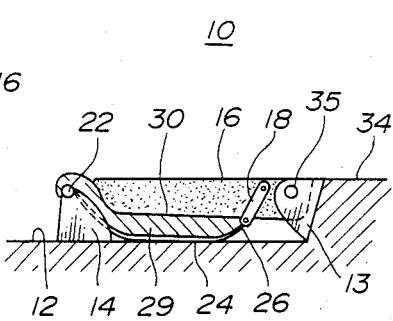

FOLDABLE SEAT ASSEMBLY FOR MOTOR VEHICLE

BACKGROUND OF THE INVENTION

1. Field of the Invention

The present invention relates in general to foldable seats for a motor vehicle, and more particularly to foldable seat assemblies of a type in which a seatback is inclinable forward to be folded on a seat proper.

2. Description of the Prior Art

In automobiles for commercial use, such as a van or the like, a so-called "foldable seat" is usually employed as a rear seat for obtaining larger luggage space when the vehicle is used as a luggage carrier. Upon requirement of larger luggage space, the seatback is inclined forward and folded on the seat proper. With this, the space defined above the folded seat can be used as an extra luggage space.

One of the conventional foldable seats is schematically shown in FIG. 4A, which comprises a seat proper 1 mounted on a depressed floor of a motor vehicle, a seatback 2 pivotally connected to the seat proper 1, and a known latch mechanism arranged between the seat proper 1 and the seatback 2 for locking the seatback 2 at a given raised position. Usually, the seat proper 1 and the seatback 2 are each constructed to have a swelled upper or front surface 3 in order to give a comfortable sitting feeling to a seat occupant.

However, as is seen from FIG. 4B, the swelled surfaces 3 of them have such a drawback that when the seatback 2 is folded on the seat proper 1, a back surface 2a of the folded seatback 2 becomes inclined considerably with respect to the floor 4 of the luggage space. However, as is easily understood, provision of such inclined surface on the luggage space floor 4 makes loading of luggages thereon difficult or at least troublesome.

SUMMARY OF THE INVENTION

It is therefore an object of the present invention to provide an improved foldable seat assembly for a motor vehicle, which is free of the above-mentioned drawback.

According to the present invention, there is provided a foldable seat assembly which, when folded, provides the foldable seatback with a back surface substantially flush with the floor of the luggage space.

According to the present invention, there is provided a foldable seat assembly which comprises a first supporting structure; a second supporting structure positioned apart from the first supporting structure; a seatback pivotally supported by the second supporting structure so that the seatback is inclinable toward the first supporting structure; a link structure pivotally connected at one end thereof to the seatback; a first frame member held by the first supporting structure; a second frame member pivotally held by the link structure; and a cushion supporting member extending between the first and second frame members, the cushion supporting member dangling loosely when a distance between the first and second supporting members is reduced to a certain degree in response to the inclination of the seatback toward the first supporting structure.

BRIEF DESCRIPTION OF THE DRAWINGS

Other objects and advantages of the present invention will become apparent from the following description when taken in conjunction with the accompanying drawings, in which:

FIG. 1 is a perspective view of a foldable seat assembly according to the present invention, with a cushion pad removed from a seat proper thereof;

FIG. 2A is a side view of the foldable seat assembly, showing a condition wherein a seatback is fully raised from the seat proper;

FIG. 2B is a side view of the foldable seat assembly, showing a condition wherein the seatback is folded fully on the seat proper;

DETAILED DESCRIPTION OF THE INVENTION

Figure 3A:
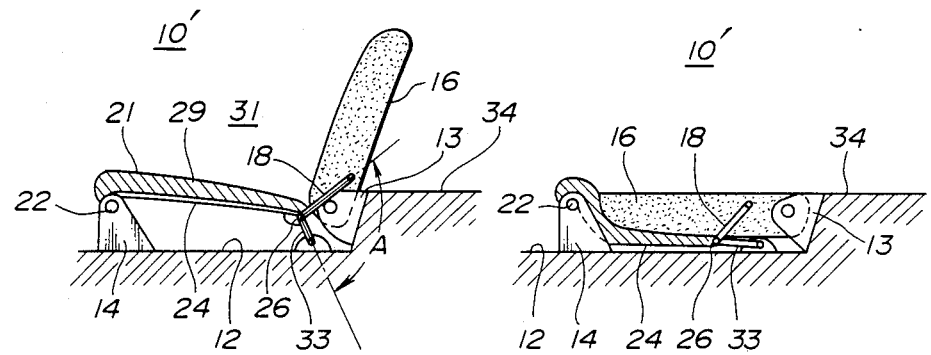
FIG. 3A is a view similar to FIG. 2A, but showing a modification of the seat assembly of the invention.

Referring to FIGS. 1, 2A and 2B, there is shown a foldable seat assembly 10 according to the present invention. The seat assembly 10 comprises generally a seat supporting structure (13, 14), a seat proper 11 and a seatback 16 which are combined in the following manner.

The seat supporting structure comprises a pair of front brackets 14 and a pair of rear brackets 13. The front brackets 14 are secured to a depressed portion 12 of a vehicle floor by means of bolts or the like. The rear brackets 13 are secured to a raised wall (no numeral) defined between the depressed floor portion 12 and a luggage space floor 34 of the vehicle.

As will be seen from FIG. 2A, the seatback 16 is pivotally supported at its lower side portions by the rear brackets 13 through a pivot shaft 35. Thus, the seatback 16 is pivotal forward and rearward relative to the vehicle floor 12 about the axis of the pivot shaft 35. Although not shown in the drawings, a known lock mechanism is arranged between the seatback 16 and one of the rear brackets 13 for locking the seatback 16 at a desired raised position. For the purpose which will be clarified hereinafter, the side portions of the seatback 16 have near the rear backets 13 respective links 18 pivotally connected thereto. More specifically, the portion to which each link 18 is connected is nearer to the top of the seatback 16 in raised state than the portion through which the pivot shaft 35 is passed.

The seat proper 11 comprises a front frame member 22 extending between the front brackets 14 and pivotally supported by the same, a rear frame member 26 extending between respective free ends of the above-mentioned links 18 and pivotally supported by the same, a pad supporting flexible sheet 24 expanding between the front and rear frames 22 and 26, and a cushion pad 29 (see FIG. 2A) tightly mounted on the sheet 24. The cushion pad 29 has an outer skin 30 integrated therewith. Front and rear ends of the outer skin 30 are trimmed and connected to the front and rear frame members 22 and 26.

In the following, the folding operation of the foldable seat 10 of the present invention will be described with reference to FIGS. 2A and 2B.

For ease of understanding, the description will be commenced with respect to an in-use condition of the seat 10 as shown in FIG. 2A wherein the seatback 16 is locked at its fully raised position by the work of the lock mechanism.

Under this in-use condition, each link 18 and the pad supporting sheet 24 are pulled against each other because the links 18 assume the farmost positions relative to the front frame member 22 of the seat proper. Thus, the pad supporting seet 24 is kept expanded thereby providing a flat and stable support for the cushion pad 29.

When, upon manipulation of a lock releasing lever (not shown) of the lock mechanism, the seatback 16 is inclined forward, the links 18 approach the front frame member 22 reducing the distance between the front and rear frame members 22 and 26. This movement makes the pad supporting sheet 24 loose. Thus, when the seatback 16 is finally folded on the seat proper 11, the cushion pad 29 is considerably flexed allowing the back surface of the seatback 16 to be flush with the luggage space floor 34, as is seen from FIG. 2B.

Figure 3B:
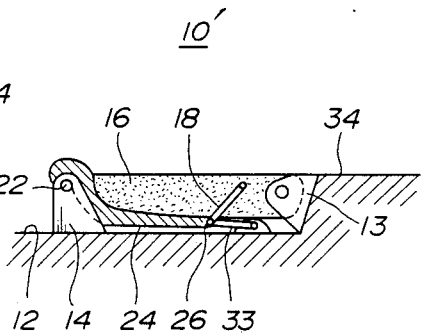
FIG. 3B is a side view of the modification, but showing a condition wherein the seatback is folded fully on the seat proper.
Figure 4A:
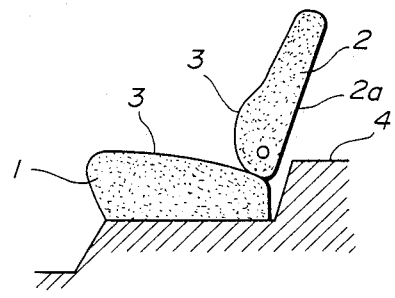
FIG. 4A is a side view similar to FIG. 2A, but showing a prior art of the invention.
Figure 4B:
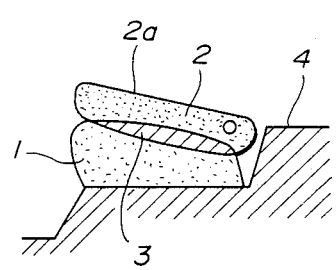
FIG. 4B is a side view of the prior art seat, but showing a condition wherein the seatback is folded fully on the seat proper.

Referring to FIGS. 3A and 3B, there is shown a modification 10' of the holdable seatback.

In this modification 10', shorter links 33 are further employed, which are associated with the links 18. As is well seen from FIG. 3A, each link 33 has a lower end pivotally connected to the floor portion 12 and the other end pivotally connected to the associated link 18. These links 33 and 18 define therebetween an angle "A" smaller than 180° when the seatback 16 assumes its fully raised locked position.

Due to provision of the shorter links 33, durability and stability of the seat proper 11 against a load (viz., weigth of a seat occupant) applied thereto are increased and improved. In fact, the load is divided by the links 18 and 33. Furthermore, the folding of the seatback 16 begins smoothly because of the inherency of the angle "A" (smaller than 180° ) defined between the links 18 and 33.

If desired, the following modifications may be also employed in the invention.

First, linked springs may be used in place of the sheet 24 so long as the linked springs can dangle loosely when the distance between the front and rear frame members 22 and 26 is reduced.

Second, an insulator material may be put between the sheet 24 and the cushion pad 29 in order to provide a seat occupant with a more comfortable sitting.

What is claimed is:

1. A foldable seat assembly comprising:

a first supporting structure;

a second supporting structure positioned apart from said first supporting structure;

a seatback pivotally supported by said second supporting structure so that said seatback is inclinable toward said first supporting structure;

a first link structure pivotally connected at one end thereof to said seatback;

a first frame member held by said first supporting structure;

a second frame member pivotally held by said first link structure; and a cushion supporting member extending between said first and second frame members, said cushion supporting member dangling loosely when a distance between said first and second supporting members is reduced to a certain degree in response to the inclination of the seatback toward the first supporting structure.

2. A foldable seat assembly as claimed in claim 1, further comprising a cushion pad tightly mounted on said cushion supporting member.

3. A foldable seat assembly as claimed in claim 2, in which said cushion supporting member comprises a flexible sheet.

4. A foldable seat assembly as claimed in claim 3, in which each of said first and second supporting structures comprises two spaced brackets.

5. A foldable seat assembly as claimed in claim 4, in which said first link structure comprises two links which are respectively and pivotally connected to side lower portions of said seatback.

6. A foldable seat assembly as claimed in claim 5, in which said first frame member extends between the two spaced brackets of the first supporting structure and pivotally held by the same, and in which said second frame member extends between said two links of said first link structure and pivotally held by the same.

7. A foldable seat assembly as claimed in claim 6, further comprising a second link structure which has one end pivotally connected to a fixed member to which said first and second supporting structures are securely mounted and the other end pivotally connected to said first link structure.

8. A foldable seat assembly as claimed in claim 7, in which said second link structure comprises two links each having one end pivotally connected to said fixed member and the other end pivotally connected to one of the two links of said first link structure.

9. A foldable seat assembly as claimed in claim 8, in which said one of the links of the first link structure and the associated link of the second link structure define therebetween an angle smaller than 180° when said seatback assumes its fully raised position.

* * * * *